(12) United States Patent
Grossman et al.

(10) Patent No.: US 9,384,047 B2
(45) Date of Patent: Jul. 5, 2016

(54) EVENT-DRIVEN COMPUTATION

(71) Applicant: D.E. Shaw Research, LLC, New York, NY (US)

(72) Inventors: J. P. Grossman, Huntington, NY (US); Jeffrey S. Kuskin, Scarsdale, NY (US)

(73) Assignee: D.E. Shaw Research, LLC, New York, NY (US)

( * ) Notice: Subject to any disclaimer, the term of this patent is extended or adjusted under 35 U.S.C. 154(b) by 183 days.

(21) Appl. No.: 14/211,294

(22) Filed: Mar. 14, 2014

(65) Prior Publication Data

US 2014/0282576 A1    Sep. 18, 2014

Related U.S. Application Data

(60) Provisional application No. 61/789,861, filed on Mar. 15, 2013.

(51) Int. Cl.
*G06F 9/46* (2006.01)
*G06F 9/48* (2006.01)

(52) U.S. Cl.
CPC ........ *G06F 9/4881* (2013.01); *G06F 2209/483* (2013.01); *G06F 2209/485* (2013.01)

(58) Field of Classification Search
None
See application file for complete search history.

(56) References Cited

U.S. PATENT DOCUMENTS

2005/0283786 A1* 12/2005 Dettinger ............... G06Q 10/10
                                                    718/104
2013/0132708 A1*  5/2013 Kurihara ................. G06F 15/80
                                                    712/42
2013/0226870 A1*  8/2013 Dash ..................... G06F 3/0619
                                                    707/634

* cited by examiner

*Primary Examiner* — Gregory A Kessler
(74) *Attorney, Agent, or Firm* — Occhiuti & Rohlicek LLP

(57) ABSTRACT

An apparatus for high-performance parallel computation, includes plural computation nodes, each having dispatch units, memories in communication with the dispatch units, and processors, each of which is in communication with the memories and the dispatch units. Each dispatch unit is configured to recognize, as ready for execution, one or more computational tasks that have become ready for execution as a result of counted remote writes into the memories. Each of the dispatch units is configured to receive a dispatch request from a processor and to determine whether there exist one or more computational tasks that are both ready and available for execution by the processor.

57 Claims, 4 Drawing Sheets counted remote write

EVENT-DRIVEN COMPUTATION

RELATED APPLICATIONS

Under 35 USC 119, this application claims the benefit of the Mar. 15, 2013 priority date of U.S. Provisional Application 61/789,861, the contents of which are herein incorporated by reference.

FIELD OF DISCLOSURE

This disclosure relates to computer architectures for high-performance parallel computation.

BACKGROUND

Exploiting parallelism to accelerate a computation typically involves dividing it into many small tasks that can be assigned to different processing elements. In particular, many scientific computations naturally decompose into small tasks that can be assigned to different nodes or processors of a multi-node architectural system when the application is parallelized. Examples of such tasks include modifying individual positions and velocities within a particle simulation, or updating the local state variables of a Navier-Stokes fluid dynamics model.

When the number of tasks per processor is large and the data is readily available, the tasks can be efficiently executed in a series of tight loops, each of which evaluates a single type of task for many different data inputs. The overhead of invoking these loops is small compared to the total compute time. When there are few tasks per processor, however, or when the tasks must wait for the arrival of data from other processors, the overheads of communication latency and synchronization can become a significant portion of the overall computation time, and it is much more challenging to keep the processors busy with useful work.

For instance, an individual node in a multi-node system typically takes input data and performs various computations on that input data. It then passes the results of such computation to other nodes that are waiting for it. In this arrangement, processing cores within a node are sometimes ready, willing, and able to carry out some computational task, but the data required to perform the task is not yet available. This means the core is idle, which is an inefficient use of computational resources.

SUMMARY

The invention is based in part on the recognition that processor utilization can be improved by allowing each task to run as soon as its input data is available. This can be achieved by formulating the computation in a fine-grained event-driven manner. Ordinarily, such task scheduling is challenging because of the expense associated with checking for the presence of multiple smaller chunks of data and choosing an execution order for the tasks whose data has arrived.

In one aspect, the invention features an apparatus for high-performance parallel computation. Such an apparatus comprises a plurality of computation nodes, each of which comprises one or more dispatch units, one or more memories in communication with the dispatch units, and one or more processors, each of which is in communication with the memory and the dispatch units. Each of the dispatch units is configured to recognize, as ready for execution, one or more computational tasks. These one or more computational tasks became ready for execution as a result of counted remote writes into the memories. Each of the dispatch units is configured to receive a dispatch request from a processor and to determine whether there exist one or more computational tasks that are both ready and available for execution by the processor.

Among the embodiments of such an apparatus are those in which each of the dispatch units is further configured to maintain one or more counters, each of which corresponds to a computational task, and to designate the computational task associated with a first counter as ready for execution in response to the counted remote writes; those in which each of the dispatch units is further configured to maintain one or more counters, each of which corresponds to a computational task, and to increment multiple counters in response to each of the counted remote writes; those in which each of the dispatch units is configured to receive, from the processor, a dispatch request specifying constraints on types of computational tasks to be executed by the processor; those in which each of the dispatch units is configured to designate a task as being executable by only a subset of processors; those in which each of the dispatch units is configured to receive, from the processor, a dispatch request, to determine that no task that is ready for execution is available for the processor, to place the dispatch request in a pending state, to detect a counted remote write that causes a particular task to become ready for execution, to determine that the particular task is appropriate for the pending dispatch request, and to provide information concerning the task to the processor; those in which each of the dispatch units is configured to receive, from the processor, a dispatch request, and to return, to the processor, information indicative of a status of the dispatch request; those in which each of the dispatch units is configured to provide, to a processor, information indicative of a computational task that is ready for execution; and those in which each of the dispatch units is configured to provide, to a processor, information that identifies a selected counter.

In some embodiments of the apparatus, each of the dispatch units is further configured to maintain one or more counters, each of which corresponds to a computational task, and to increment a first counter. Among these are embodiments in which each of the dispatch units is configured to increment the first counter in response to a counted remote write, as well as embodiments in which each of the dispatch units is configured to increment the first counter in response to a message from a processor from the one or more processors.

In other embodiments of the apparatus, each of the dispatch units is configured to provide, to a processor, a pointer to an event handler for executing the computational task that is ready for execution. Among these are embodiments in which the processor is configured to execute the event handler, and, in response to completion of the computational task that is ready for execution, to issue a new dispatch request to the dispatch unit.

Yet other embodiments of the apparatus include those in which each of the dispatch units is configured to maintain, for the computational task, information indicative of a priority of the computational task that is ready for execution relative to other computational tasks that are ready for execution. Among these are embodiments in which each of the dispatch units is configured to select a computational task that is ready for execution by the processor based at least in part on the information indicative of a priority.

In other embodiments, each dispatch unit is configured to receive, from a dispatch request, information about the computational task, the information being indicative of a priority of the computational task that is ready for execution relative to other computational tasks that are ready for execution.

In yet other embodiments, each dispatch unit is configured to provide, in response to dispatch requests from plural processors from a subset of processors, a copy of a task to each of the plural processors. This results in plural processors performing the same task.

Individual computations performed by the system are performed faster than a human being can perform the same computations by pencil and paper or equivalents thereof, and in particular are performed in under 100 milliseconds.

As used in the claims, the apparatus is intended to mean a tangible and physical machine that consumes energy, and that thereby performs transformations on matter. The term "apparatus" as used in the claims is hereby defined to exclude "software per se." To the extent there exist any forms of the apparatus that are outside the scope of 35 USC 101 as of the filing date of this application, such apparatus are hereby excluded from claim scope. As used herein and in the claims, the word "apparatus" is defined to mean only such apparatus that are compliant with 35 USC 101 as of the time of filing of this application.

In another aspect, the invention features a method for engaging in high-performance parallel computation. Such a method includes providing a plurality of computation nodes, each of which includes one or more dispatch units, one or more memories in communication with the dispatch units, and one or more processors, each of which is in communication with the memory and the dispatch units, causing a dispatch unit to recognize, as ready for execution, one or more computational tasks, the one or more computational tasks having become ready for execution as a result of counted remote writes into the memories, causing the dispatch unit to receive a dispatch request from a processor, and causing the dispatch unit to determine whether there exist one or more computational tasks that are available for execution by the processor.

Practices of the method include those that further include causing each of the dispatch units to maintain one or more counters, each of which corresponds to a computational task, and causing each of the dispatch units to designate the computational task associated with a first counter as ready for execution in response to the counted remote writes; those that further include causing each of the dispatch units to maintain one or more counters, each of which corresponds to a computational task, and causing each of the dispatch units to increment multiple counters in response to each of the counted remote writes; those that further include causing each of the dispatch units to provide, to a processor, a pointer to an event handler for executing the computational task that is ready for execution; those that further include causing each of the dispatch units to provide, to a processor, information indicative of a computational task that is ready for execution; those that further include causing each of the dispatch units to provide, to a processor, information that identifies a selected counter; those that further include causing the processor to execute the event handler, and, in response to completion of the computational task that is ready for execution, to issue a new dispatch request to the dispatch unit; those that further include causing each of the dispatch units to be configured to receive, from the processor, a dispatch request specifying constraints on types of computational tasks to be executed by the processor; those that further include causing each of the dispatch units to designate a task as being executable by only a subset of processors; those that further include causing a dispatch unit to receive, from the processor, a dispatch request, to determine that no task that is ready for execution is available for the processor, to place the dispatch request in a pending state, to detect a counted remote write that causes a particular task to become ready for execution, to determine that the particular task is appropriate for the pending dispatch request, and to provide information concerning the task to the processor; those that further include causing the dispatch unit to receive, from the processor, a dispatch request, and to return, to the processor, information indicative of a status of the dispatch request; those that further include causing each of the dispatch units to maintain, for the computational task, information indicative of a priority of the computational task that is ready for execution relative to other computational tasks that are ready for execution; those that further include causing a dispatch unit to select a computational task that is ready for execution by the processor based at least in part on the information indicative of a priority, and those that include, at each dispatch unit, receiving a dispatch request having information for the computational task, the information being indicative of a priority of said computational task that is ready for execution relative to other computational tasks that are ready for execution.

Other practices include causing a dispatch unit to maintain one or more counters, each of which corresponds to a computational task, and to increment a first counter. Among these practices are those in which causing the dispatch unit to increment a first counter includes causing the dispatch unit to increment the first counter in response to a counted remote write, and those in which causing the dispatch unit to increment the first counter includes causing the dispatch unit to increment the first counter in response to a message from a processor from the one or more processors.

Additional practices of the method include those having the further step of causing each of the dispatch units to copy a task to a subset of processors; those having the further step of receiving, at a dispatch unit, information for the computational task, the information being indicative of a priority of the computational task that is ready for execution relative to other computational tasks that are ready for execution; and those having the further step of causing a dispatch unit to provide, in response to dispatch requests from plural processors from subset of processors, a copy of a task to each of the plural processors.

Other practices of the invention include any combination of the foregoing features.

As used herein, both in the specification and in the accompanying claims, the word "method" is expressly defined to include only those methods that are compliant with 35 USC 101 as of the time of filing this application. All other methods are expressly excluded from the scope of the claims.

In another aspect, the invention features a manufacture including a tangible and non-transitory computer readable medium having encoded thereon software for causing a data processing system to engage in high-performance parallel computation. The data processing system includes a plurality of computation nodes, each of which includes one or more dispatch units, one or more memories in communication with the dispatch units, and one or more processors, each of which is in communication with the memory and the dispatch units. The software includes instructions for causing a dispatch unit to recognize, as ready for execution, one or more computational tasks, the one or more computational tasks having become ready for execution as a result of counted remote writes into the memories, causing the dispatch unit to receive, at a dispatch unit, a dispatch request from a processor, and causing the dispatch unit to determine whether there exist one or more computational tasks that are available for execution by the processor.

Embodiments include those in which the software further includes instructions for causing each of the dispatch units to maintain one or more counters, each of which corresponds to a computational task, and causing each of the dispatch units to designate the computational task associated with a first counter as ready for execution in response to the counted remote writes; those in which the software further includes instructions for causing each of the dispatch units to maintain one or more counters, each of which corresponds to a computational task, and causing each of the dispatch units to increment multiple counters in response to each of the counted remote writes; those in which the software further includes instructions for causing each of the dispatch units to provide, to a processor, information indicative of a computational task that is ready for execution; those in which the software further includes instructions for causing each of the dispatch units to provide, to a processor, information that identifies a selected counter; those in which the software further includes instructions for causing each of the dispatch units to be configured to receive, from the processor, a dispatch request specifying constraints on types of computational tasks to be executed by the processor; those in which the software further includes instructions for causing each of the dispatch units to designate a task as being executable by only a subset of processors; those in which the software further includes instructions for causing a dispatch unit to receive, from the processor, a dispatch request, to determine that no task that is ready for execution is available for the processor, to place the dispatch request in a pending state, to detect a counted remote write that causes a particular task to become ready for execution, to determine that the particular task is appropriate for the pending dispatch request, and to provide information concerning the task to the processor; and those in which the software further includes instructions for causing the dispatch unit to receive, from the processor, a dispatch request, and to return, to the processor, information indicative of a status of the dispatch request.

Other embodiments include those in which the software further includes instructions for causing a dispatch unit to maintain one or more counters, each of which corresponds to a computational task, and to increment a first counter. Among these are embodiments in which the instructions for causing the dispatch unit to increment a first counter comprise instructions for causing the dispatch unit to increment the first counter in response to a counted remote write; and also those in which the instructions for causing the dispatch unit to increment the first counter comprise instructions for causing the dispatch unit to increment the first counter in response to a message from a processor from the one or more processors.

In other embodiments, software further includes instructions for causing a dispatch unit to provide, to a processor, a pointer to an event handler for executing the computational task that is ready for execution. Among these are embodiments in which the software further includes instructions for causing the processor to execute the event handler, and, in response to completion of the computational task that is ready for execution, to issue a new dispatch request to the dispatch unit.

Also among the embodiments are those in which the software further includes instructions for causing each of the dispatch units to maintain, for the computational task, information indicative of a priority of the computational task that is ready for execution relative to other computational tasks that are ready for execution. Among these are embodiments in which the software further includes instructions for causing a dispatch unit to select a computational task that is ready for execution by the processor based at least in part on the information indicative of a priority.

Alternative embodiments also include those in which the software further comprises instructions for causing each of the dispatch units to copy a task to a subset of processors; those in which the software further comprises instructions for receiving, at a dispatch unit, information for the computational task, the information being indicative of a priority of the computational task that is ready for execution relative to other computational tasks that are ready for execution; and those in which the software further comprises instructions for causing a dispatch unit to provide, in response to dispatch requests from plural processors from subset of processors, a copy of a task to each of the plural processors.

Other embodiments include a manufacture incorporating any of the foregoing additional features.

As used herein and in the claims, the term "computer-readable medium" is intended to include only tangible and non-transitory media. Examples of such media include surfaces of varying physical properties, with variations indicative of instructions. Physical properties that may vary include magnetization vector, reflectivity, transmittivity, and other propagation characteristics, and quantum states. To the extent "computer-readable medium" can be construed as covering something outside the scope of 35 USC 101 as of the filing of this application, such construction is hereby excluded from claim scope.

These and other features of the invention will be apparent from the following detailed description and the accompanying figures in which:

DETAILED DESCRIPTION

Described herein are computer architectures for high-performance parallel computation. Such architectures comprise multiple nodes. In some embodiments, the nodes can be implemented as application specific integrated circuits ("ASICs").

Figure 1:
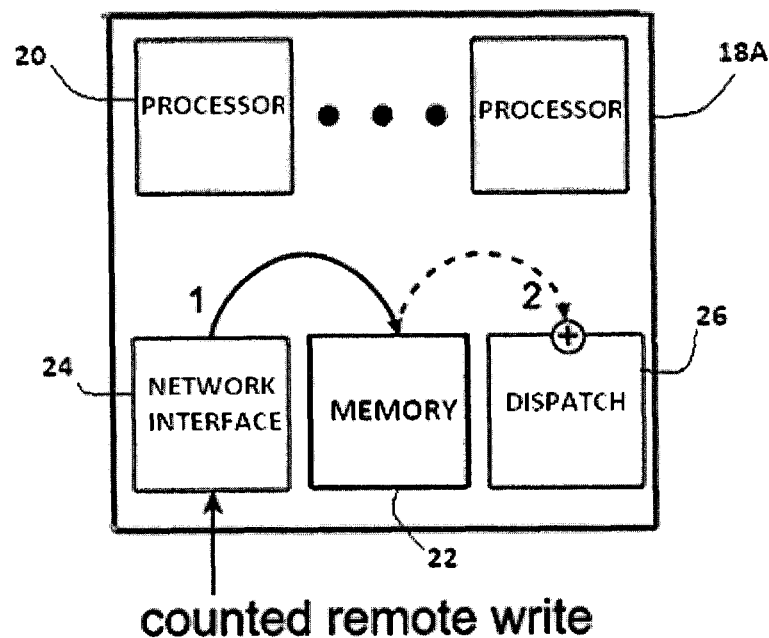
FIG. 1 shows certain portions of an application-specific integrated circuit.

Each of the nodes contains, at a minimum, one or more programmable cores or processors 20, memory 22, and one or more dispatch units 26, as shown in FIG. 1. The nodes may also include a network interface 24. In one embodiment, the node can include these elements as part of one or more computational blocks or tiles 18A. These computational blocks or tiles 18A may be connected to one another by a network, such as an on-chip mesh network.

In certain embodiments, each computational block or tile 18A contains several programmable cores or processors 20, memory 22, a network interface 24, and a dispatch unit 26. In some embodiments, the memory 22 is a static random access memory.

A particular processor 20 carries out computational tasks using, as input data, data that is written to a memory 22. Thus, if the data required to perform a task is not available in the memory 22, then that processor 20 remains idle. The dispatch unit 26 provides a way to reduce the likelihood of extended idleness by providing information that enables the processors 20 in the first portion of the node to find something useful to do.

In a typical parallel processing application, there are often different kinds of computational tasks, each of which requires different input data. This input data typically arrives at the network interface 24 via some communication network. One approach to managing computation is to wait for all data associated with all instances of a first type of task to arrive, and to then evaluate all instances of that first type of task. This process is then repeated for the second type of task. The result is an execution schedule 30 as shown in FIG. 2.

Figure 2:
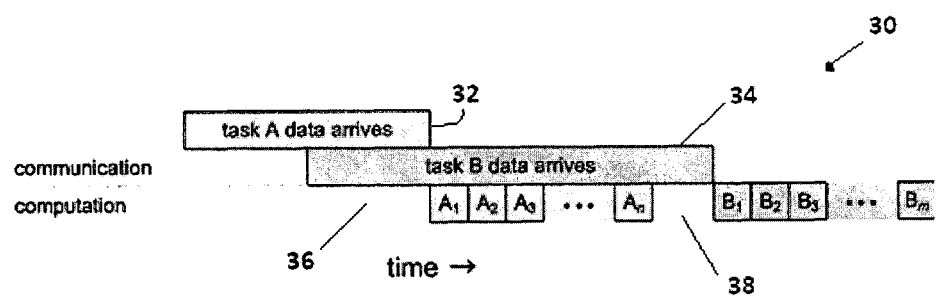
FIG. 2 shows an execution schedule for one of the processors shown in FIG. 1.

The execution schedule 30 shown in FIG. 2 shows the first data 32, which is required for a first task, beginning to arrive first. At some point before the first data 32 finishes arriving, second data 34 required for a second task begins to arrive. In response, the processor 20 does nothing until all of the first data has arrived, at which point it proceeds to carry out all the tasks associated with the first data 32. By the time the processor 20 finishes all the tasks associated with the first data 32, the second data 34 has not yet finished arriving. As a result, the processor 20 stops and waits for the second data 34 to finish arriving, whereupon it begins to carry out the tasks associated with the second data 34. This results in a first gap 36, because the processor 20 does not begin to work until all of the first data 32 has arrived, followed by a second gap 38 that arises for essentially the same reason.

The above inefficiency in the execution schedule 30 of FIG. 2 arises because of its coarse granularity. The dispatch unit 26 disclosed herein reduces this inefficiency by providing a more fine-grained schedule, as suggested by an event-driven execution schedule 40 shown in FIG. 3. As used herein, an "event" means the arrival of all input data required for a particular computational task. Once an event has occurred, the computational task associated with that event is considered ready for execution.

Figure 3:
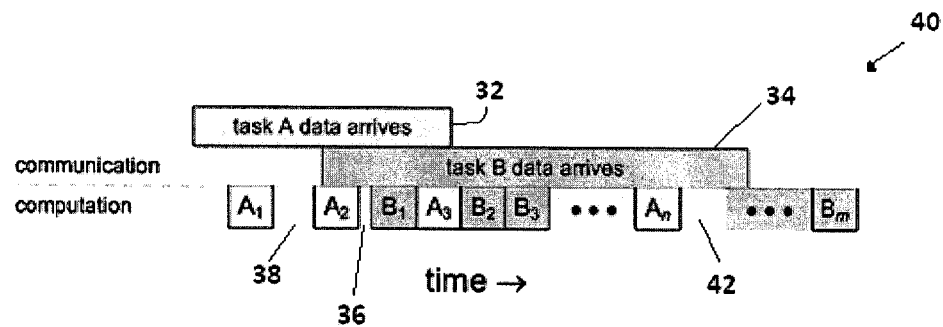
FIG. 3 shows an event-driven execution schedule for one of the processors shown in FIG. 1.

In an event-driven schedule 40, as shown in FIG. 3, an event handler carries out the task associated with an event as soon as that event occurs. As is apparent, the gaps 36, 38, 42 during which the node is idle can, in aggregate, be shorter in the event-driven execution schedule 40 shown in FIG. 3 than they are in the execution schedule 30 shown in FIG. 2. Because individual tasks are allowed to execute as soon as their data arrives, this implementation achieves better overlap of communication with computation, resulting in improved processor utilization and faster overall execution.

It is possible, of course, for several events to have occurred, thus creating several tasks ready for execution. This raises the question of which task should be executed first.

One approach is to handle the events in the order in which they occur, for example, by keeping track of events within a first-in, first-out queue. While this approach is simple, it neglects the fact that some tasks cannot be done without having completed certain other tasks. This dependency results in these tasks defining critical paths in a computation. A useful event-handling system would thus prioritize tasks associated with some events over others.

Figure 4:
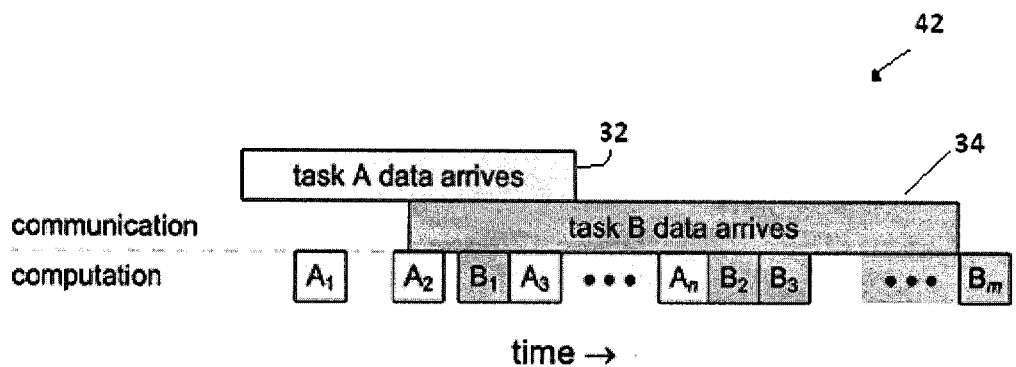
FIG. 4 shows another event-driven execution schedule for one of the processors shown in FIG. 1.

An example of an execution schedule 42 that adopts this approach is shown in FIG. 4, in which task "A" is on a critical path of the overall computation and task "B" is not. As shown in FIG. 4, events associated with task "A" are handled ahead of those associated with task "B" even though the latter events may have occurred first.

Of course, an event handler is useless unless some processor 20 knows enough to execute it. Thus, some way must be provided to enable the processors 20 to know that an event has occurred, that a computational task is ready for execution, and that a processor 20 is needed to execute an event handler to handle the computational task. Some way must therefore exist to permit events to be detected, to associate events with event handlers, and to schedule execution of event handlers. The dispatch unit 26 shown in FIG. 1 and described herein is what makes all this possible.

Referring back to FIG. 1, data in the node is read from and written to the local memory 22. In some embodiments, a processor 20 from any portion of the node can read or write to the memory 22 within any other portion of the node. In other embodiments, any processor 20 within any node in a parallel machine can read or write to the memory 22 within any other node. For example, a processor 20 from any computational block or tile 18A can read or write to the memory 22 within any other computational block or tile 18A. Data is read from and written to memory 22 in units of memory words 19, shown in FIG. 6. In a particular embodiment, a processor 20 reads from and writes to the memory 22 in units of quad words, or "quads," each of which has 128 bits.

When a processor 20 of a second computational block or tile 18A writes a memory word to a particular address in the memory 22 of the first computational block or tile 18A, the first computational block or tile 18A receives the write via its network interface 24. It then writes the data into its memory 22 and tells its dispatch unit 26 that a write has occurred at the particular address.

Meanwhile, the dispatch unit 26 maintains a set of counters. Each counter is associated with a task and has a corresponding threshold and an event type associated with the task. Each counter is also associated with one or more words of data stored within the dispatch unit 26.

Each counter, together with its threshold, associated data and event type, is associated with a computational task. For each such computational task, the counter and the threshold provide a basis for determining whether the task is ready for execution. Once the value of a counter reaches the threshold, the dispatch unit 26 marks the task as ready, thus indicating that the task is available for execution by a processor 20 within the computational block or tile 18A.

Based on the address of a memory write, the dispatch unit 26 increments one or more counters that are associated with one or more tasks that require the information in the recently written memory word. It then compares the value of each counter with its threshold for that task. If the two are equal, the dispatch unit 26 marks the task as ready for execution.

Such a write is called a "counted remote write" because in response to occurrence of such a write, a counter containing the number of writes that have occurred since the last time the register was reset is incremented by one, and because it is possible for such a write to be carried out remotely from the computational block or tile 18A associated with the processor 20 that initiated the write.

Meanwhile, the processors 20 are busy performing their tasks. When one of them is done with a task, it issues a dispatch request (or query) to the dispatch unit 26 for its computational block or tile 18A. The dispatch request, which is essentially a request for something to do, contains a list of event types that the processor 20 is willing to undertake, together with a list of priorities for each event type. In other words, a dispatch request amounts to a processor 20 saying "I am willing to handle event types A and B, but if you have both available, I prefer A." In one embodiment, the dispatch request specifies the set of event types in up to four priority levels. In other embodiments, the dispatch request specifies the set of event types in n priority levels, where n is some positive integer greater than 1.

In response to receiving a dispatch request, the dispatch unit 26 searches through its set of tasks that are ready for execution and identifies one that satisfies the constraints set forth in the dispatch request. The dispatch unit 26 then returns the data associated with this counter to the processor 20 that issued the dispatch request. In one embodiment, the data includes a pointer to an event handler to handle the event. In a further embodiment, the dispatch unit 26 also returns information to the processor 20 that directly identifies the counter that was selected.

Figure 5:
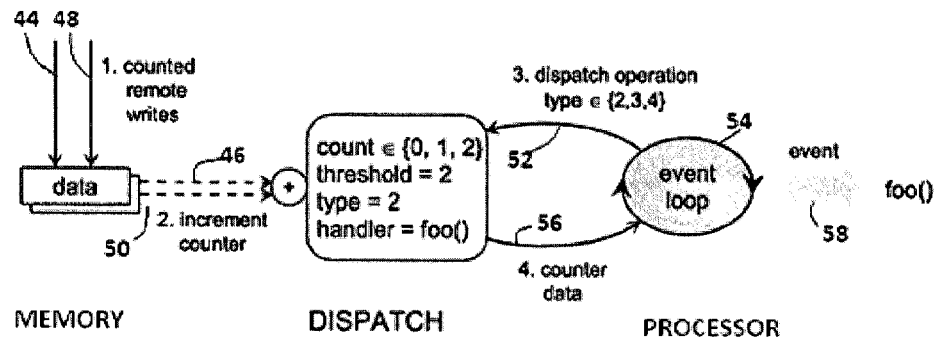
FIG. 5 shows an event loop executed by one of the processors shown in FIG. 1.

FIG. 5 illustrates a particular example in which a first counted remote write occurs at the memory 22 (step 44). This causes a corresponding counter to be incremented (step 46). The particular counter shown in the figure has a threshold of 2. At the end of the first counted remote write, the value of the counter is "1." Soon thereafter, there is a second remote write that is again associated with the counter (step 48). This increments the counter again (step 50), so that the value of the counter is now "2." At this point, the counter value equals the threshold, and the event is therefore ready for execution.

While executing an event loop 54, a processor 20 completes execution of a task and promptly issues a dispatch request (step 52) indicating it is available to execute tasks of type 2, 3, and 4. Since the particular counter is of type 2, the counter data is provided to the processor 20 (step 56). This counter data also includes a pointer to the event handler, which in the illustrated example is "foo( )." The processor 20 then proceeds to execute the handler (step 58).

In some cases, constraints can be imposed by the dispatch unit 26. For example, a dispatch unit 26 may permit only a subset of processors 20 to handle a particular task that is ready for execution. In that case, if a processor 20 that is not in that subset issues a dispatch request, the dispatch unit 26 will not assign such a task to that processor 20. Instead, it will wait for a dispatch request from a more suitable processor.

In other cases, a dispatch unit 26 provides a copy of a task to each processor 20 in a subset of processors 20 in response to a dispatch request by that processor 20. In this case, several processors 20 within the subset will be performing the same task.

A processor 20 can thus be viewed as executing an event-handling loop, in which it alternately issues a dispatch request to fetch the next event and then proceeds to handle that event. When done handling the event, the processor 20 issues another dispatch request, thus starting the event-handling loop 54 all over again. In one embodiment, all processors 20 in a computational block or tile 18A query the same dispatch unit 26, namely the dispatch unit 26 for that computational block or tile 18A. This approach thus inherently provides dynamic load-balancing for all processors 20 in the computational block or tile 18A.

Although many other embodiments are possible, one particular embodiment of a dispatch unit 26 includes 128 counters, each of which has 32 bits to specify a count, 32 bits to specify a threshold, 5 bits to specify an event type, and 128 bits of programmer-specified counter data that form the result of a dispatch request.

A dispatch unit 26 can arbitrarily map memory word addresses of counted remote writes to various counters. This reduces the amount of global information shared and communicated between computational blocks or tiles 18A, since the processor 20 that initiates a counted remote write only needs to know a destination address, and does not need to specify what counter or counters are to be incremented.

It is possible for multiple tasks to depend on the same input data. To accommodate this, the dispatch unit 26 provides the ability to increment more than one counter in response to a counted remote write. To support this operation, the dispatch unit 26 maintains counter lists. In one embodiment, the dispatch unit 26 maintains 128 counters and 128 counter lists, each of which specifies an arbitrary subset of the 128 counters.

In alternative embodiments, there are different numbers of counters, and different numbers of counter lists.

A particular memory word in the memory 22 can be mapped to either a counter or a counter list. In one embodiment, this scheme uses 8 bits per memory word, with one bit to select between a counter or a list of such counters, and the remaining seven bits to specify one of 128 counters or counter lists. In other embodiments, n bits are used per memory word with 1 bit to select between a counter or list of counters and the remaining n−1 bits to specify one of $2^{n-1}$ counters or counter lists, where n is some positive integer greater than 1.

Figure 6:
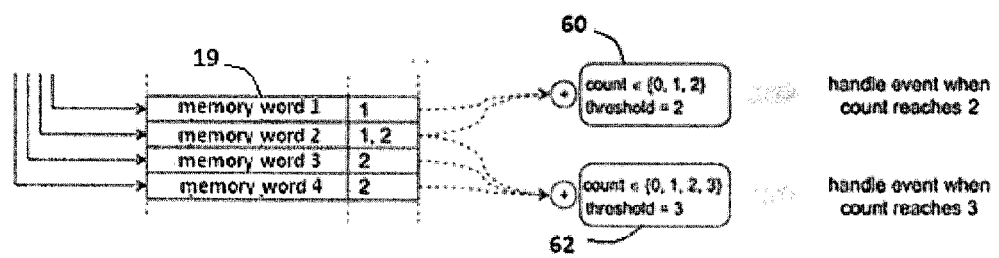
FIG. 6 shows mappings of memory words to counters and counter lists.

FIG. 6 shows an example of a particular memory word being mapped to either a counter or a counter list. When "memory word 1" is written into memory 22, only a first counter 60 is incremented because that memory location is mapped to a counter. When "memory word 3" or "memory word 4" are written into memory 22, only a second counter 62 is incremented because that memory location is mapped to a counter. However, the location for "memory word 2" is mapped to a counter list, not a counter. Thus, when "memory word 2" is written into memory 22, both first and second counters 60, 62 are incremented.

To issue a dispatch request, a processor 20 atomically exchanges a request with a special memory address. This means no hardware support for dispatch requests is required within the processor 20 beyond the processor's already existing ability to perform an exchange with the memory 22, and, in some embodiments, to perform a 128-bit atomic exchange with the memory 22. This request specifies the event types that the processor 20 can accept. In one embodiment, there are up to four priority levels for the event types. In other embodiments, there are fewer than four priority levels, whereas in others, there are more than four priority levels.

A counter, in some embodiments, can include an extra "phase" bit to indicate whether it is associated with the present iteration of some application-level loop or a future iteration. This phase bit can be added to the counter type to determine an effective type. For example a counter of type 12 that makes use of such a phase bit will have an effective type of 12 when the value of the phase bit is 0 and an effective type of 13 when the value of the phase bit is 1. The effective type is used to determine whether or not the counter type is one that the processor 20 can accept, based on the information in the dispatch request. This allows the processor 20 to distinguish between present work and future work in forming dispatch requests, so that future work is appropriately postponed to a following iteration of the application-level loop.

A dispatch request is successful when at least one task that is ready for execution matches the requirements of the dispatch request. When this occurs, the dispatch unit 26 selects the task having the highest priority, based on the dispatch request's constraints, and returns the data corresponding to that counter to the processor 20.

In one embodiment, whether a dispatch request succeeds or fails, a message is immediately sent back to the processor 20 that issued the dispatch request to indicate whether the dispatch request failed or succeeded.

In another embodiment, if a dispatch request fails, it simply stalls until a task that satisfies the constraints of the dispatch request finally becomes ready for execution. At this point, the dispatch request succeeds and proceeds normally. This stalling behavior avoids the need to poll from the processors 20 within a polling loop and thus reduces latency between the time an event becomes ready for execution and the time that the processor 20 invokes an event handler.

Figure 7:
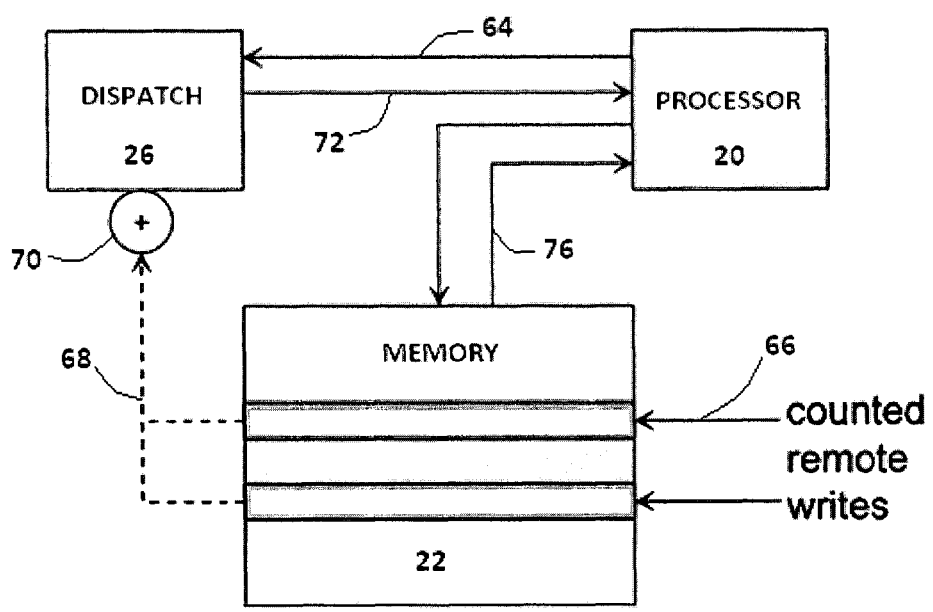
FIG. 7 shows the sequence of steps in a blocking dispatch operation.

FIG. 7 shows the evolution of a stalling dispatch request from an initial request to eventual success. The procedure begins with a processor 20 issuing a dispatch request (step 64). Since no events that are ready for execution satisfy the constraints of the dispatch request, the dispatch request stalls. Shortly thereafter, counted remote writes are received at the memory 22 (step 66), and the relevant addresses are forwarded to the dispatch unit 26 (step 68). The dispatch unit 26 then increments the appropriate counters (step 70). Upon doing so, the dispatch unit 26 recognizes that these recent counted remote writes have caused a counter to reach its threshold so that a task is made ready for execution, and that the task's event type satisfies the constraints of the stalled dispatch request. The dispatch unit 26 then returns the data associated with the counter to the processor 20 (step 72), which then reads any data that it requires from the memory 22 (step 76), possibly including the data whose arrival caused the counter to become ready.

The architecture described herein provides for more efficient use of computational resources by reducing the amount of time a processor 20 is idle. This also tends to result in more rapid execution of computational tasks. It also permits computational tasks to be dynamically prioritized, allowing tasks that lie on the critical path of a large-scale computation to be completed sooner. This tends to result in more rapid execution of a large-scale computation as a whole.

Instructions for carrying out the procedure described herein are stored in a non-transitory and tangible machine-readable medium.

Having described the invention, and a preferred embodiment thereof, what we claim as new, and secured by Letters Patent is:

1. An apparatus for high-performance parallel computation, said apparatus comprising
   a plurality of computation nodes, each of which comprises one or more dispatch units,
   one or more memories in communication with said dispatch units, and one or more processors, each of which is in communication with said memory and said dispatch units,
   wherein each of said dispatch units is configured to recognize, as ready for execution, one or more computational tasks, said one or more computational tasks having become ready for execution as a result of counted remote writes into said memories, and
   wherein each of said dispatch units is configured to receive a dispatch request from a processor and to determine whether there exist one or more computational tasks that are both ready and available for execution by said processor.

2. The apparatus of claim 1, wherein each of said dispatch units is further configured to maintain one or more counters, each of which corresponds to a computational task, and to increment a first counter.

3. The apparatus of claim 2, wherein each of said dispatch units is configured to increment said first counter in response to said counted remote write.

4. The apparatus of claim 2, wherein each of said dispatch units is configured to increment said first counter in response to a message from a processor from said one or more processors.

5. The apparatus of claim 1, wherein each of said dispatch units is further configured to maintain one or more counters, each of which corresponds to a computational task, and to designate the computational task associated with a first counter as ready for execution in response to said counted remote writes.

6. The apparatus of claim 1, wherein each of said dispatch units is further configured to maintain one or more counters, each of which corresponds to a computational task, and to increment multiple counters in response to each of said counted remote writes.

7. The apparatus of claim 1, wherein each of said dispatch units is configured to provide, to a processor, a pointer to an event handler for executing said computational task that is ready for execution.

8. The apparatus of claim 7, wherein said processor is configured to execute said event handler, and, in response to completion of said computational task that is ready for execution, to issue a new dispatch request to said dispatch unit.

9. The apparatus of claim 1, wherein each of said dispatch units is configured to provide, to a processor, information indicative of a computational task that is ready for execution.

10. The apparatus of claim 1, wherein each of said dispatch units is configured to provide, to a processor, information that identifies a selected counter.

11. The apparatus of claim 1, wherein each of said dispatch units is configured to maintain, for said computational task, information indicative of a priority of said computational task that is ready for execution relative to other computational tasks that are ready for execution.

12. The apparatus of claim 11, wherein said dispatch unit is configured to select a computational task that is ready for execution by said processor based at least in part on said information indicative of a priority.

13. The apparatus of claim 1, wherein each of said dispatch units is configured to receive, from said processor, a dispatch request specifying constraints on types of computational tasks to be executed by said processor.

14. The apparatus of claim 1, wherein each of said dispatch units is configured to designate a task as being executable by only a subset of processors.

15. The apparatus of claim 1, wherein said dispatch unit is configured to receive, from said processor, a dispatch request, to determine that no task that is ready for execution is available for said processor, to place said dispatch request in a pending state, to detect a counted remote write that causes a particular task to become ready for execution, to determine that said particular task is appropriate for said pending dispatch request, and to provide information concerning said task to said processor.

16. The apparatus of claim 1, wherein said dispatch unit is configured to receive, from said processor, a dispatch request, and to return, to said processor, information indicative of a status of said dispatch request.

17. The apparatus of claim 1, wherein each of said dispatch units is configured to copy a task to a subset of processors.

18. The apparatus of claim 1, wherein each of said dispatch units is configured to receive, from a dispatch request, information for said computational task, said information being indicative of a priority of said computational task that is ready for execution relative to other computational tasks that are ready for execution.

19. The apparatus of claim 1, wherein each of said dispatch units is configured to provide, in response to dispatch requests from plural processors from a subset of processors, a copy of a task to each of said plural processors.

20. A method for engaging in high-performance parallel computation, said method comprising providing a plurality of computation nodes, each of which comprises one or more dispatch units, one or more memories in communication with said dispatch units, and one or more processors, each of which is in communication with said memory and said dispatch units; causing a dispatch unit to recognize, as ready for execution, one or more computational tasks, said one or more computational tasks having become ready for execution as a result of counted remote writes into said memories; causing said dispatch unit to receive, at a dispatch unit, a dispatch request from a processor; and causing said dispatch unit to determine whether there exist one or more computational tasks that are available for execution by said processor.

21. The method of claim 20, further comprising causing a dispatch unit to maintain one or more counters, each of which corresponds to a computational task, and to increment a first counter.

22. The method of claim 21, wherein causing said dispatch unit to increment a first counter comprises causing said dispatch unit to increment said first counter in response to a counted remote write.

23. The method of claim 21, wherein causing said dispatch unit to increment said first counter comprises causing said dispatch unit to increment said first counter in response to a message from a processor from said one or more processors.

24. The method of claim 20 further comprising causing each of said dispatch units to maintain one or more counters, each of which corresponds to a computational task, and causing each of said dispatch units to designate said computational task associated with a first counter as ready for execution in response to said counted remote writes.

25. The method of claim 20 further comprising causing each of said dispatch units to maintain one or more counters, each of which corresponds to a computational task, and causing each of said dispatch units to increment multiple counters in response to each of said counted remote writes.

26. The method of claim 20 further comprising causing each of said dispatch units to provide, to a processor, a pointer to an event handler for executing said computational task that is ready for execution.

27. The method of claim 23, further comprising causing said processor to execute said event handler, and, in response to completion of said computational task that is ready for execution, to issue a new dispatch request to said dispatch unit.

28. The method of claim 20 further comprising causing each of said dispatch units to provide, to a processor, information indicative of a computational task that is ready for execution.

29. The method of claim 20 further comprising causing each of said dispatch units to provide, to a processor, information that identifies a selected counter.

30. The method of claim 20 further comprising causing each of said dispatch units to maintain, for said computational task, information indicative of a priority of said computational task that is ready for execution relative to other computational tasks that are ready for execution.

31. The method of claim 30 further comprising causing each of said dispatch units to select a computational task that is ready for execution by said processor based at least in part on said information indicative of a priority.

32. The method of claim 20 further comprising causing each of said dispatch units to be configured to receive, from said processor, a dispatch request specifying constraints on types of computational tasks to be executed by said processor.

33. The method of claim 20 further comprising causing each of said dispatch units to designate a task as being executable by only a subset of processors.

34. The method of claim 20 further comprising causing each of said dispatch units to receive, from said processor, a dispatch request, to determine that no task that is ready for execution is available for said processor, to place said dispatch request in a pending state, to detect a counted remote write that causes a particular task to become ready for execution, to determine that said particular task is appropriate for said pending dispatch request, and to provide information concerning said task to said processor.

35. The method of claim 20 further comprising causing each of said dispatch units to receive, from said processor, a dispatch request, and to immediately return, to said processor, information indicative of a status of said dispatch request.

36. The method of claim 20 further comprising causing each of said dispatch units to copy a task to a subset of processors.

37. The method of claim 20 further comprising receiving, at a dispatch unit, information for said computational task, said information being indicative of a priority of said computational task that is ready for execution relative to other computational tasks that are ready for execution.

38. The method of claim 20 further comprising causing a dispatch unit to provide, in response to dispatch requests from plural processors from a subset of processors, a copy of a task to each of said plural processors.

39. A manufacture comprising a tangible and non-transitory computer readable medium having encoded thereon software for causing a data processing system to engage in high-performance parallel computation, said data processing system comprising a plurality of computation nodes, each of which comprises one or more dispatch units, one or more memories in communication with said dispatch units, and one or more processors, each of which is in communication with said memory and said dispatch units; said software comprising instructions for causing a dispatch unit to recognize, as ready for execution, one or more computational tasks, said one or more computational tasks having become ready for execution as a result of counted remote writes into said memories, causing said dispatch unit to receive, at a dispatch unit, a dispatch request from a processor, and causing said dispatch unit to determine whether there exist one or more computational tasks that are available for execution by said processor.

40. The manufacture of claim 39, wherein said software further comprises instructions for causing a dispatch unit to maintain one or more counters, each of which corresponds to a computational task, and to increment a first counter.

41. The manufacture of claim 40, wherein said instructions for causing said dispatch unit to increment a first counter comprise instructions for causing said dispatch unit to increment said first counter in response to a counted remote write.

42. The manufacture of claim 40, wherein said instructions for causing said dispatch unit to increment said first counter comprise instructions for causing said dispatch unit to increment said first counter in response to a message from a processor from said one or more processors.

43. The manufacture of claim 39, wherein said software further comprises instructions for causing each of said dispatch units to maintain one or more counters, each of which corresponds to a computational task, and causing each of said dispatch units to designate said computational task associated with a first counter as ready for execution in response to said counted remote writes.

44. The manufacture of claim 39, wherein said software further comprises instructions for causing each of said dispatch units to maintain one or more counters, each of which corresponds to a computational task, and causing each of said dispatch units to increment multiple counters in response to each of said counted remote writes.

45. The manufacture of claim 39, wherein said software further comprises instructions for causing a dispatch unit to provide to a processor, a pointer to an event handler for executing said computational task that is ready for execution.

46. The manufacture of claim 39, wherein said software further comprises instructions for causing said processor to execute said event handler, and, in response to completion of said computational task that is ready for execution, to issue a new dispatch request to said dispatch unit.

47. The manufacture of claim 39, wherein said software further comprises instructions for causing each of said dispatch units to provide, to a processor, information indicative of a computational task that is ready for execution.

48. The manufacture of claim 39, wherein said software further comprises instructions for causing each of said dispatch units to provide, to a processor, information that identifies a selected counter.

49. The manufacture of claim 39, wherein said software further comprises instructions for causing each of said dispatch units to maintain, for said computational task, information indicative of a priority of said computational task that is ready for execution relative to other computational tasks that are ready for execution.

50. The manufacture of claim 49, wherein said software further comprises instructions for causing a dispatch unit to select a computational task that is ready for execution by said processor based at least in part on said information indicative of a priority.

51. The manufacture of claim 39, wherein said software further comprises instructions for causing each of said dispatch units to be configured to receive, from said processor, a dispatch request specifying constraints on types of computational tasks to be executed by said processor.

52. The manufacture of claim 39, wherein said software further comprises instructions for causing each of said dispatch units to designate a task as being executable by only a subset of processors.

53. The manufacture of claim 39, wherein said software further comprises instructions for causing a dispatch unit to receive, from said processor, a dispatch request, to determine that no task that is ready for execution is available for said processor, to place said dispatch request in a pending state, to detect a counted remote write that causes a particular task to become ready for execution, to determine that said particular task is appropriate for said pending dispatch request, and to provide information concerning said task to said processor.

54. The manufacture of claim 39, wherein said software further comprises instructions for causing said dispatch unit to receive, from said processor, a dispatch request, and to return, to said processor, information indicative of a status of said dispatch request.

55. The manufacture of claim 39, wherein said software further comprises instructions for causing each of said dispatch units to copy a task to a subset of processors.

56. The manufacture of claim 39, wherein said software further comprises instructions for receiving, at a dispatch unit, information for said computational task, said information being indicative of a priority of said computational task that is ready for execution relative to other computational tasks that are ready for execution.

57. The manufacture of claim 39, wherein said software further comprises instructions for causing a dispatch unit to provide, in response to dispatch requests from plural processors from a subset of processors, a copy of a task to each of said plural processors.

\* \* \* \* \*